US008395339B2

(12) United States Patent
Kato et al.

(10) Patent No.: US 8,395,339 B2
(45) Date of Patent: Mar. 12, 2013

(54) MOTOR CONTROL DEVICE

(75) Inventors: Koichi Kato, Anjo (JP); Keisuke Nishimura, Anjo (JP); Zhiqian Chen, Anjo (JP); Subrata Saha, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 185 days.

(21) Appl. No.: 13/018,897

(22) Filed: Feb. 1, 2011

(65) Prior Publication Data
US 2011/0234135 A1  Sep. 29, 2011

(30) Foreign Application Priority Data

Mar. 26, 2010  (JP) ................. 2010-072336

(51) Int. Cl.
*H02P 6/18* (2006.01)
(52) U.S. Cl. ............... 318/400.33; 318/461; 318/474; 318/496; 318/721
(58) Field of Classification Search ............ 318/400.33, 318/461, 466, 474, 496, 721
See application file for complete search history.

(56) References Cited

U.S. PATENT DOCUMENTS

| 5,144,564 | A | * | 9/1992 | Naidu et al. ............... 318/721 |
|---|---|---|---|---|
| 5,994,870 | A | | 11/1999 | Kaneko et al. |
| 6,320,349 | B1 | | 11/2001 | Kaneko et al. |
| 6,894,454 | B2 | | 5/2005 | Patel et al. |
| 7,230,398 | B2 | | 6/2007 | Miyauchi |
| 7,511,448 | B2 | | 3/2009 | Terada et al. |
| 8,106,622 | B2 | * | 1/2012 | Aoki et al. ............... 318/812 |
| 2002/0060548 | A1 | | 5/2002 | Iwaji et al. |
| 2007/0132424 | A1 | | 6/2007 | Takao et al. |
| 2008/0246426 | A1 | * | 10/2008 | Aoki et al. ............... 318/461 |

FOREIGN PATENT DOCUMENTS

| JP | A-10-229699 | 8/1998 |
|---|---|---|
| JP | A-2001-339999 | 12/2001 |
| JP | A-2005-333761 | 12/2005 |
| JP | A-2007-159334 | 6/2007 |
| JP | A-2008-79489 | 4/2008 |

OTHER PUBLICATIONS

Apr. 26, 2011 International Search Report issued in PCT/JP2011/052013 (with translation).
Dec. 21, 2012 Office Action issued in German Patent Application No. 112011100395.1 (with Translation).

* cited by examiner

*Primary Examiner* — Paul Ip
(74) *Attorney, Agent, or Firm* — Oliff & Berridge, PLC

(57) ABSTRACT

A motor control device that has a high-frequency component, and a DC bias component that has a magnitude which causes a motor to be magnetically saturated and take on a certain value over a predetermined period, and is positively and negatively symmetrical are impressed as an observation command on a d-axis current command. The polarity of the magnetic pole of a permanent magnet is identified based on a relationship of large and small magnitudes between a first amplitude, which is attained during a period during which a DC bias component takes on a positive certain value, among amplitudes of a high-frequency component contained in a d-axis response voltage computed based on a feedback current respondent to the observation command, and a second amplitude attained during a period during which the DC bias component takes on a negative certain value.

4 Claims, 5 Drawing Sheets

MOTOR CONTROL DEVICE

INCORPORATION BY REFERENCE

The disclosure of Japanese Patent Application No. 2010-072336 filed on Mar. 26, 2010, including the specification, drawings and abstract thereof, is incorporated herein by reference in its entirety.

BACKGROUND OF THE INVENTION

1. Field of the Invention

The present invention relates to a motor control device having a function of detecting a magnetic-pole position of a permanent magnet synchronous motor in a sensor-less manner.

2. Description of the Related Art

As a control method for a permanent magnet type synchronous motor, for example, a three-phase synchronous motor, a control method called vector control is known. In the vector control, a motor current flowing into three-phase stator coils of a motor is coordinate-transformed into vector components along a d axis, which lies in a direction of a magnetic field generated by a permanent magnet disposed in a rotor, and a q axis orthogonal to the d axis, whereby feedback control is carried out. For the coordinate transformation, it is necessary to highly precisely detect the position of the rotor (magnetic-pole position). For the magnetic-pole position detection, a rotation sensor such as a resolver is used. A sensor-less magnetic-pole detection technology of electrically detecting a magnetic-pole position by utilizing counter-electromotive force deriving from rotation of the rotor is also available. However, when the motor is stopped, since the counter-electromotive force is not developed, a high-frequency current or a high-frequency voltage is applied to the motor. Based on the response, the magnetic-pole position is estimated.

In JP-A-2008-79489, a motor control device having such a sensor-less magnetic-pole detecting function has been disclosed. According to the publication, an error between a magnetic-pole position obtained based on a q-axis current detected by applying an alternating voltage to a motor, and an estimated magnetic-pole position is corrected in order to obtain the magnetic-pole position. Further, a d-axis voltage command is obtained based on a d-axis current command on which a d-axis bias current of a constant wave that alternates positively and negatively symmetrically is superposed, and the d-axis voltage command is applied to the motor. The direction of a magnetic pole of a permanent magnet is identified based on the relationship of large and small magnitudes of the d-axis bias current between when the d-axis bias current is increased at the positive-to-negative switching timing of the d-axis bias current and when the d-axis bias current is decreased thereat.

The motor control device described in JP-A-2008-79489 has an excellent sensor-less magnetic-pole detection function capable of identifying the position of a magnetic pole as well as the polarity of the magnetic pole. However, at the positive-to-negative switching timing of the d-axis bias current, there is a possibility that a d-axis current may be in a transient state and a d-axis voltage may not be stable. As a result, there arises a possibility that the stability in identifying the polarity of the magnetic pole may be impaired and erroneous detection may be invited.

Therefore, it is desired that when a permanent magnet type synchronous motor is stopped, the polarity of a magnetic pole of the motor is stably identified without use of a rotation sensor.

SUMMARY OF THE INVENTION

In consideration of the foregoing problems, a characteristic construction of a motor control device in accordance with the present invention is as described below.

A motor control device that controls an alternating-current (AC) motor in a vector space with a d-axis, which is in a direction of a magnetic field generated by a permanent magnet disposed in a rotor of the AC motor, and a q-axis orthogonal to the d-axis includes:

a current control block that computes voltage commands in the vector space on the basis of current commands in the vector space, and feedback currents that have detection values of currents, which flow into respective stator coils of the AC motor, coordinate-transformed into the vector space and fed back;

an observation command impress block that impresses a predetermined high-frequency component as an observation command on the current command on a d-axis or the voltage command on the d-axis, and positively and negatively symmetrically impresses thereon a direct-current (DC) bias component, which takes on a certain value over a predetermined period and has a magnitude that causes the motor to be magnetically saturated, as the observation command; and a polarity identification section that identifies the polarity of a magnetic pole of the permanent magnet on the basis of a relationship of large and small magnitudes between a first amplitude, which is attained during a period during which the DC bias component takes on a positive certain value, among amplitudes of the high-frequency component contained in a d-axis response voltage computed based on the feedback current respondent to the observation command, and a second amplitude attained during a period during which the DC bias component takes on a negative certain value.

When a DC bias component of a magnitude causing a motor to be magnetically saturated over a predetermined period is impressed on a d-axis current command, if the DC bias component is positive or negative, a magnetic flux reaches a saturation domain. Since a permanent magnet has the magnetic flux, even when a d-axis current is a nil, the magnetic flux is not a nil. The property of the magnetic flux with respect to the d-axis current is offset in the d-axis direction. Therefore, assuming that when the DC bias component takes on one of positive and negative values, the magnetic flux reaches the saturation domain, when the DC bias component takes on the other value, the magnetic flux lies in an active domain but does not reach the saturation domain. An observation command contains not only the DC bias component but also a high-frequency component. The magnetic flux therefore fluctuates in response to the high-frequency component. At this time, although the magnetic flux largely fluctuates in the active domain, but the magnetic flux does not fluctuate so largely in the saturation domain as in the active domain. Whether the DC bias component is positive or negative when the magnetic flux reaches the saturation domain is determined with the polarity of the magnetic pole of the permanent magnet. In other words, whether the DC bias component is positive or negative when the magnetic flux reaches the saturation domain is determined with whichever of the north (N) and south (S) poles of the permanent magnet is oriented in the positive direction of the d-axis. The fluctuation of the magnetic flux can be observed using a response voltage computed based on a feedback current sent from the motor in response to the observation command. Therefore, based on the relationship of large and small magnitudes between a first amplitude of the response voltage attained during a period during which the DC bias component is positive, and a second amplitude of the response voltage attained during a period during which the DC bias component is negative. Since the polarity of the permanent magnet is not identified during a transient period such as at the positive-to-negative switching timing of the DC bias component, but identified based on a response returned during a period during which the DC bias component is stably positive or negative. Therefore, the identification can be achieved stably. Namely, when the permanent magnet type synchronous motor is stopped, the polarity of the magnetic pole of the motor can be stably identified without use of a rotation sensor.

The observation command impress block of the motor control device in accordance with the present invention impresses a predetermined high-frequency component as the observation command on the d-axis current command, and positively and negatively symmetrically impresses thereon a DC bias component, which takes on a certain value over a predetermined period and has a magnitude that causes the motor to be magnetically saturated, as the observation command. Preferably, the response voltage is the d-axis voltage command computed based on the feedback current respondent to the observation command. In general, in vector control, differences between current commands in a vector space and feedback currents in the vector space are obtained, and proportional integral (PI) control or proportional integrodifferential (PID) control is performed to compute voltage commands in the vector space. As mentioned above, in order to identify the polarity of a magnetic pole, the high-frequency component and DC bias component are impressed as the observation command in the vector space. When both the components are impressed on the d-axis current command, the observation command can be readily controlled. In addition, since the voltage commands are computed using the feedback currents that are results of response to the observation command, when the voltage command is used as the response voltage, a function of computing the response voltage need not be separately included. Namely, an ordinary vector control function can be utilized in order to compute the response voltage so as to identify the polarity.

The motor control device in accordance with the present invention further includes a position identification section that identifies the position of a magnetic pole of the permanent magnet irrespective of the polarity thereof on the basis of high-frequency components of the voltage commands computed based on the feedback currents respondent to the high-frequency component of the observation command. Preferably, before the position identification section identifies the position of the permanent magnet, the observation command impress block impresses the high-frequency component as the observation command. After the position of the permanent magnet is identified, the high-frequency component and bias component are impressed as the observation command. If a vector space in which current commands are designated and an actual vector space are out of phase, a DC bias component on the d-axis is vector-decomposed to have a q-axis component. The DC bias component to be impressed on the d-axis current command has a magnitude that causes the motor to be magnetically saturated. Therefore, a DC component that becomes the q-axis current command due to vector decomposition has a magnitude that cannot be ignored. When a large current command is added to the q-axis, a motor torque is generated and a rotor is rotated. Owing to the inclusion of the position identification section that identifies the direction of the magnetic pole of the permanent magnet irrespective of the polarity thereof, the phase difference between the vector space in which the current commands are designated and the actual vector space is nearly limited to 0° or 180°. Therefore, the DC bias component is not impressed on the q-axis current command, but the polarity of the magnetic pole can be stably identified.

DETAILED DESCRIPTION OF THE EMBODIMENTS

Figure 1:
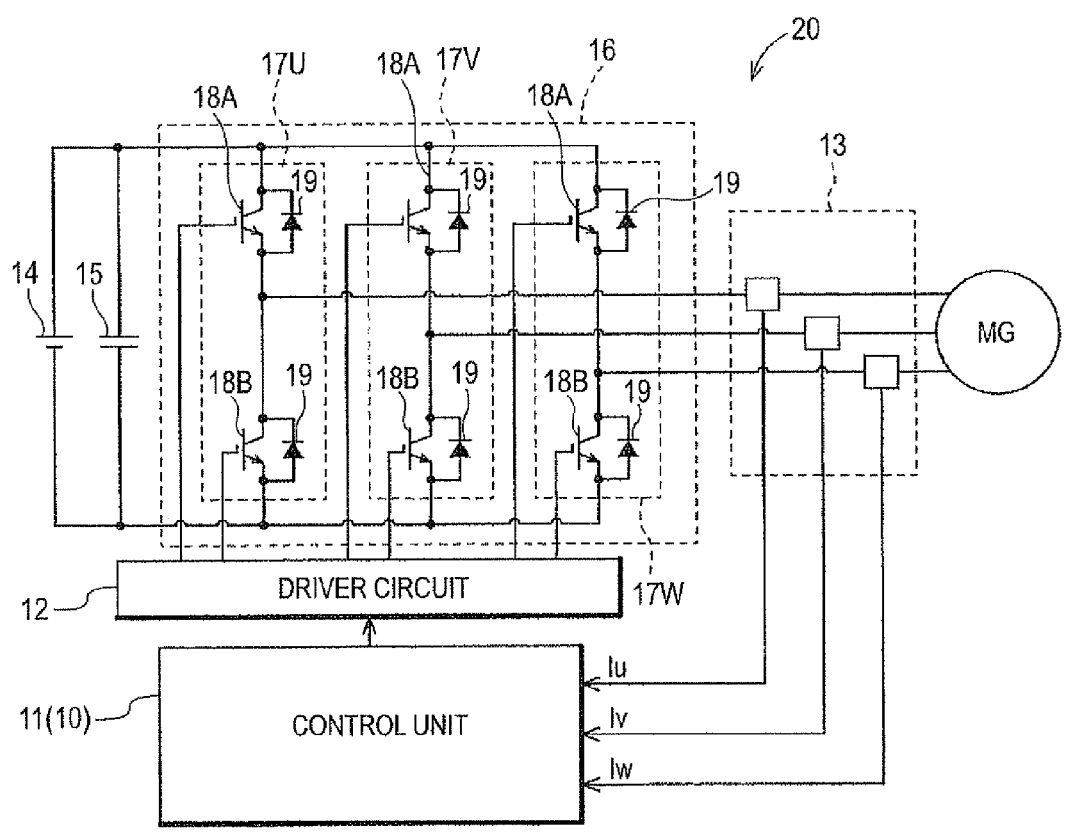
FIG. 1 is a diagram illustratively showing an example of a configuration of a motor driving system.

Referring to the drawings, an embodiment of the present invention will be described below. A motor control device 10 of the present invention is a motor control device that has a function of detecting a magnetic-pole position of an alternating current (AC) motor MG (hereinafter, simply, a motor) without using a rotation sensor such as a resolver, that is, in a so-called sensor-less manner. In the present embodiment, the motor MG is an interior permanent magnet synchronous motor (IPMSM), and has saliency (including reverse saliency) signifying that the magnetic characteristic in an N-pole direction of a permanent magnet of a rotor is electrically different from the magnetic characteristic in a direction perpendicular to the N-pole direction (a direction deviated by an electrical angle of 90°). In the present embodiment, the motor control device utilizes the saliency to identify a magnetic-pole position or the direction of a magnetic pole in a sensor-less manner even when the motor MG is stopped, which will be detailed later. In addition, needless to say, the motor MG is a rotating machine that functions as a generator.

To begin with, the configuration of a driving system 20 that drives and controls the motor MG will be described. As shown in FIG. 1, the driving system 20 includes a control unit 11, a driver circuit 12, a current detection device 13, a DC power supply 14, a smoothing capacitor 15, and an inverter 16. Herein, the DC power supply 14 is a rechargeable secondary battery such as a battery. The driving system 20 converts a DC power of the DC power supply 14 into a three-phase AC power of a predetermined frequency, and feeds the AC power to the motor MG. In addition, when the motor MG functions as a generator, the driving system 20 converts a generated AC power into a DC power, and feeds the DC power to the DC power supply 14. The smoothing capacitor 15 is connected in parallel with the DC power supply 14 between the positive terminal of the DC power supply 14 and the negative terminal thereof, and smoothes the DC power.

The inverter 16 includes plural switching elements. Preferably, an insulated gate bipolar transistor (IGBT) or a metal oxide semiconductor field-effect transistor (MOSFET) is adopted as the switching elements. As shown in FIG. 1, in the present embodiment, the IGBT is adopted as the switching elements. The inverter 16 includes a U phase leg 17U, a V phase leg 17V, and a W phase leg 17W associated with the phases (three phases of a U phase, V phase, and W phase) of the motor MG. The legs 17U, 17V, and 17W each include a pair of switching elements formed with an IGBT 18A of an upper-side arm and an IGBT 18B of a lower-side arm which are connected in series with each other. A freewheel diode 19 is connected in parallel with each of the IGBTs 18A and 18B.

The U phase leg 17U, V phase leg 17V, and W phase leg 17W are connected to a U phase coil, a V phase coil, and a W phase coil respectively of the motor MG. At this time, a node between the emitter of the IGBT 18A of the upper-side arm of each of the phase legs 17U, 17V, and 17W and the collector of the IGBT 18B of the lower-side arm thereof, and each of the phase coils of the motor MG are electrically connected to each other. In addition, the collector of the IGBT 18A of the upper-side arm of each of the legs 17U, 17V, and 17W is connected onto a high-voltage power line coupled to the positive terminal of the DC power supply 14, while the emitter of the IGBT 18B of the lower-side arm of each of the legs 17U, 17V, and 17W is connected onto a ground line coupled to the negative terminal of the DC power supply 14.

The inverter 16 is connected to the control unit 11 via the driver circuit 12, and performs a switching action in response to a control signal produced by the control unit 11. The control unit 11 is constructed as an electronic control unit (ECU) having a logic circuit such as a microcomputer, which is not shown, as a core. The ECU includes, in addition to the microcomputer, an interface circuit and other peripheral circuits that are not shown. The interface circuit includes a counter-electromagnetic interference (EMI) part and a buffer circuit.

The microcomputer includes a CPU core, a program memory, a work memory, an A/D converter, and a communication control section, a timer, and ports that are not shown. The CPU core is a core of the microcomputer, and includes an instruction register, an instruction decoder, an arithmetic logic unit (ALU) that executes various arithmetic operations, a flag register, a general-purpose register, and an interrupt controller. The program memory is a nonvolatile memory in which a motor control program, a magnetic pole identification program, and various parameters that are referenced at the time of executing the programs are stored. Preferably, the program memory is formed with, for example, a flash memory. The work memory is a memory in which tentative data is temporarily stored during program execution. A volatile memory may be used as the work memory without any problem. Preferably, the work memory is formed with a dynamic RAM (DRAM) or a static RAM (SRAM) in or from which data can be written or read at a high speed. The CPU core, A/D converter, and various memories may be integrated into one chip, or a computer system may be constructed with plural chips.

Incidentally, especially when the motor MG is a drive unit for vehicles, the DC power supply 14 handles a high voltage, and the IGBTs 18A and 18B of the inverter 16 switch the high voltage. The potential difference between the high and low levels of a pulsating gate driving signal (control signal) that is inputted to the gate of the IGBT which switches the high voltage is a much higher voltage than an operating voltage of a typical electronic circuit such as a microcomputer. Therefore, the gate driving signal is inputted to each of the IGBTs 18A and 18B of the inverter 16 after voltage conversion or insulation is achieved via the driver circuit 12.

As mentioned above, the motor MG is driven with a predetermined output torque at a predetermined rotating speed under the control of the control unit 11. At this time, the values of currents flowing into respective stator coils of the motor MG (U phase coil, V phase coil, and W phase coil) are fed back to the control unit 11. The control unit 11 executes proportional integral (PI) control or proportional integrodifferential (PID) control according to deviations from target currents so as to drive or control the motor MG. Therefore, current values flowing through conductors (bus bars or the like) laid down between the phase legs 17U, 17V, and 17W of the inverter 16 and the phase coils of the motor MG are detected by the current detection device 13. In the present embodiment, the current detection device 13 is disposed for all of the three phases. The three-phase currents are balanced and the instantaneous values are zero. Therefore, a construction in which the current values of two phases alone are detected will do.

Figure 2:
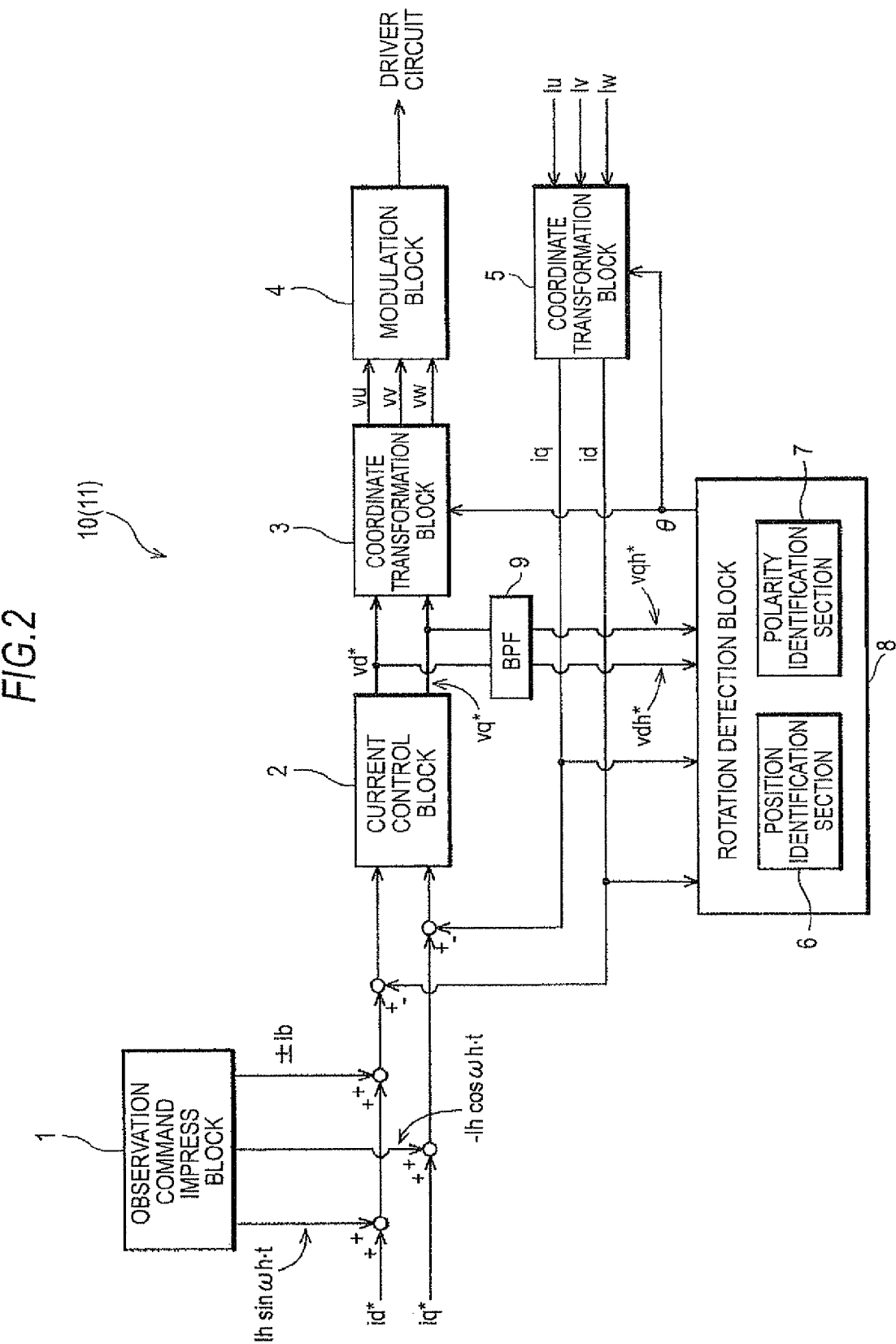
FIG. 2 is a block diagram illustratively showing an example of an embodiment of a motor control device.

In the present embodiment, the motor control device 10 is constructed as the control unit 11. The motor control device 10 controls the motor MG through vector control. Specifically, the motor control device 10 controls the motor MG in a vector space defined with a d-axis, which is in the direction of a magnetic field generated by a permanent magnet disposed in a rotor of the motor MG, and a q-axis orthogonal to the d-axis. Incidentally, in sensor-less control, since an actual magnetic-pole position cannot be detected, the motor MG cannot be controlled in a vector space stemming from transformation based on an actual magnetic-pole position. Therefore, the motor MG is controlled in a vector space obtained based on an estimated magnetic-pole position. FIG. 2 shows functional blocks deeply related to a rotation detection block 8, which identifies a magnetic-pole position of the rotor or the direction of a magnetic pole thereof, in the motor control device 10. Referring to FIG. 2, vector control in the motor control device 10 of the present embodiment will be described below.

When the motor MG is a drive unit for vehicles, a torque command (request torque) is fed from a running control ECU or the like, which is not shown, to the motor control device 10. A torque control block, which is not shown, of the motor control device 10 designates current commands (target currents) id* and iq*, which are necessary to current feedback control, in response to a torque command. The current commands id* and iq* are designated in line with the vector space having the d-axis and q-axis as references. Therefore, the torque control block includes a current command value calculation section that determines the d-axis current command id* and q-axis current command iq* on the basis of the torque command value and an angular velocity ω calculated based on a magnetic-pole position (electrical angle) θ obtained by the rotation detection block 8.

Based on the current commands id* and iq* in the dq vector space, and feedback currents id and iq that have detection values of currents Iu, Iv, and Iw, which flow into the respective stator coils of the motor MG, coordinate-transformed into the vector space and then fed back, a current control block 2 computes voltage commands (target voltages) vd* and vq* in the vector space. More particularly, based on deviations between the current commands id* and iq* and the feedback currents id and iq, the current control block 2 performs, for example, proportional integral (PI) control or proportional integrodifferential (PID) control to designate the voltage commands vd* and vq*.

Since current values detected by the current detection device 13 are three-phase currents Iu, Iv, and Iw, they are coordinate-transformed into two-phase feedback currents id and iq on the basis of an electrical angle θ by a coordinate transformation block 5. The current control block 2 performs PI control or PID control on the basis of deviations between the current commands id* and iq* and the feedback currents id and iq, and designate voltage commands vd* and vq*. Illustration of an angular velocity w and a functional block that detects the angular velocity is omitted for brevity's sake. The voltage commands vd* and vq* computed by the current control block 2 are coordinate-transformed into three-phase voltage commands vu, vv, and vw on the basis of the electrical angle θ by a coordinate transformation block 3. A modulation block 4 produces a gate driving signal, with which three-phase IGBTs of the inverter 16 are driven, on the basis of the three-phase voltage commands vu, vv, and vw through, for example, pulse width modulation (PWM).

As mentioned above, for vector control of the motor MG, it is necessary to perform coordinate transformation between an actual three-phase space associated with u, v, and w phases, and a two-phase dq vector space. Therefore, it is necessary to highly precisely detect a rotational angle θ of a rotor, that is, an electrical magnetic-pole position (electrical angle). The motor control device 10 in accordance with the present embodiment does not include a rotation detection device such as a resolver but adopts sensor-less control in which the rotational angle θ of the rotor is acquired. As mentioned above, when the motor MG is rotated at an intermediate or high speed, since a counter-electromotive force deriving from rotation of the rotor is utilized, not only the rotating speed (angular velocity w) but also the magnetic-pole position (rotational angle θ) can be electrically detected. Since this is a public knowledge, illustration and a description will be omitted. In contrast, when the motor MG is stopped, the counter-electromotive force is naturally not generated. Therefore, an electrical stimulus is given to the motor MG, and the response is used to identify the magnetic-pole position and the polarity of a magnetic pole.

An electrical stimulus is given by an observation command impress block 1. The observation command impress block 1 impresses a predetermined high-frequency component as an observation command on a d-axis current command id* or a d-axis voltage command vd*. In the present embodiment, as shown in FIG. 2, the predetermined high-frequency component (=Ih·sin ωh·t) having an amplitude Ih is impressed on the d-axis current command id*. In the present embodiment, in order to more highly precisely identify a magnetic-pole position, the predetermined high-frequency component (=−Ih·cos ωh·t) is impressed on a q-axis current command iq* alike. The high-frequency component to be impressed on the d-axis current command id*, and the high-frequency component to be impressed on the q-axis current command iq* are, as shown in FIG. 2, waves that share in command the amplitude Ih and angular velocity ωh but have different phases. The high-frequency components are, as described later, used to identify both the magnetic-pole position and the polarity.

In addition, the observation command impress block 1 positively and negatively symmetrically impresses, as shown in FIG. 2, a DC bias component Ib, which takes on a certain value over a predetermined period and has a magnitude that that causes the motor MG to be magnetically saturated, as an observation command on the d-axis current command id*. Specifically, a positive DC bias component (+Ib) and a negative DC bias component (−Ib) are impressed as the certain value over the predetermined period. As described later, the value Ib is equivalent to the magnitude causing the motor MG to be magnetically saturated. More particularly, the value Ib is equivalent to a magnitude causing the stator cores, which are armature cores about which the phase coils of the motor MG are wound, to be magnetically saturated. The aforesaid high-frequency component and DC bias component Ib are used to identify the polarity of a magnetic pole. This will be detailed later.

As shown in FIG. 2, the rotation detection block 8 includes a position identification section 6 that identifies a magnetic-pole position irrespective of polarity, and a polarity identification section 77 that identifies the polarity of a magnetic pole, that is, performs NS identification. The position identification section 6 identifies the magnetic-pole position of the permanent magnet irrespective of polarity on the basis of the high-frequency components of voltage commands computed based on deviations between feedback currents id and iq, which are respondent to the high-frequency component of an observation command, and current commands id* and iq*. Namely, the magnetic-pole position of the permanent magnet is identified with NS polarity excluded. The polarity identification section 77 identifies the polarity of the magnetic pole of the permanent magnet on the basis of the amplitude (wave height) of a high-frequency component contained in a d-axis response voltage computed based on the high-frequency component of the observation command and the d-axis feedback current id respondent to the DC bias component Ib. More particularly, the polarity is identified based on a relationship of large and small magnitudes between a first amplitude (a1), which is attained during a period during which the DC bias component Ib takes on a positive certain value, among amplitudes of the high-frequency components contained in the response voltage, and a second amplitude (a2) attained during a period during which the DC bias component Ib takes on a negative certain value (see FIG. 5 and FIG. 6). In the present embodiment, a voltage command vd* is adopted as the response voltage.

A description will be made of identification of a magnetic-pole position and a magnetic-pole direction. To begin with, position identification by the position identification section 6 will be described below. Assuming that Vd denotes a d-axis voltage, Vq denotes a q-axis voltage, Id denotes a d-axis current, Iq denotes a q-axis current, R denotes a resistance of a stator coil, Ld denotes a d-axis inductance, Lq denotes a q-axis inductance, ω denotes a motor rotational frequency (angular velocity), φa denotes a main magnetic flux of a magnetic field, and p denotes a differential operator, a voltage equation for a synchronous motor is provided as a general equation (1) below.

$$\begin{bmatrix} Vd \\ Vq \end{bmatrix} = \begin{bmatrix} R+pLd & -\omega Lq \\ \omega Ld & R+pLq \end{bmatrix} \begin{bmatrix} Id \\ Iq \end{bmatrix} + \begin{bmatrix} 0 \\ \omega \phi a \end{bmatrix} \qquad (1)$$

Detection of a magnetic pole by the rotation detection block 8 is carried out when the motor MG is stopped. When the motor MG is stopped, since w=0 is established, the equation (1) becomes an equation (2) below.

$$\begin{bmatrix} Vd \\ Vq \end{bmatrix} = \begin{bmatrix} R+pLd & 0 \\ 0 & R+pLq \end{bmatrix} \begin{bmatrix} Id \\ Iq \end{bmatrix} \qquad (2)$$

As mentioned above, an observation command serving as an impulse for position identification by the position identification section 6 is a high-frequency component, and a complex impedance is dominated by an imaginary-number component. A real-number component R in the equation (2) may be ignored. In other words, the equation (2) can be simplified into an equation (3) with respect to the observation command that is the high-frequency component, and the effects of the d-axis inductance Ld and q-axis inductance Lq become dominant.

$$\begin{bmatrix} Vd \\ Vq \end{bmatrix} = \begin{bmatrix} pLd & 0 \\ 0 & pLq \end{bmatrix} \begin{bmatrix} Id \\ Iq \end{bmatrix} \quad (3)$$

Figure 3:
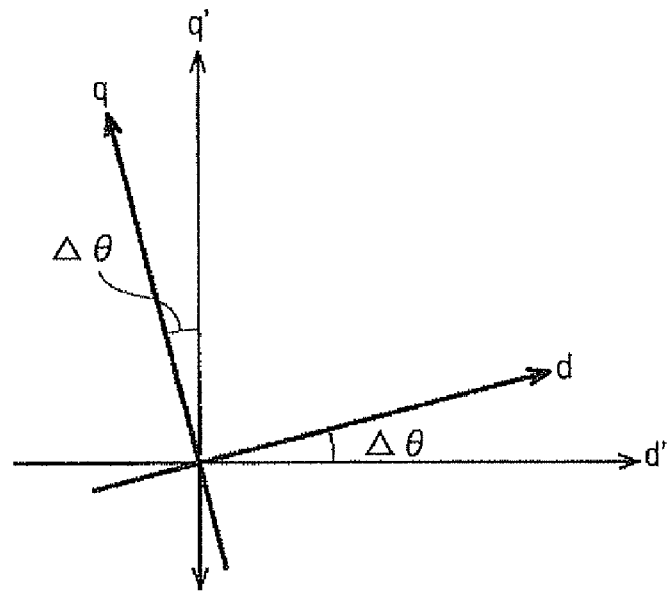
FIG. 3 is a diagram showing a deviation of a vector space due to an error of a magnetic-pole position.

For position identification by the position identification section 6, an estimated value θ' of a magnetic-pole position is given as a tentative value. Herein, a vector space based on the estimated value θ' is called a d'q' vector space. When the estimated value θ' does not square with a true magnetic-pole position θ, an error Δθ is, as shown in FIG. 3, present between the true dq vector space based on the true magnetic-pole position θ and the d'q' vector space. If the aforesaid high-frequency component is impressed in the d'q' vector space based on the estimated value θ', a bandpass filter (BPF) 9 extracts high-frequency components vdh* and vqh* from voltage commands vd* and vq* computed based on feedback currents id' and iq' in the d'q' vector space. The high-frequency components vdh* and vqh* extracted by the bandpass filter 9 are sent to the position identification section 6 of the rotation detection block 8, and a sine-wave signal sin 2Δθ that is twice larger than the error Δθ between the estimated value θ' of the magnetic-pole position and the true magnetic-pole position θ is obtained as an error signal. When the estimated value θ' is dynamically corrected so that the error Δθ can converge at zero, the magnetic-pole position θ is calculated. Herein, even when the estimated value θ' is corrected so that the error Δθ can converge at zero, the sine-wave signal sin 2Δθ contains a value that is twice larger than the error Δθ is. Therefore, the calculated magnetic-pole position θ contains a phase difference of 0° or 180°. In other words, the magnetic-pole position θ is specified to be either of two points that are point-symmetrical to each other within 360°. Namely, the magnetic-pole position θ is identified without any consideration of the NS polarity.

As mentioned above, the magnetic-pole position θ can be identified based on the high-frequency components vdh* and vqh* obtained from the voltage commands vd* and vq*, which are computed based on the feedback currents id and iq respondent to the observation command that is a high-frequency component, by the bandpass filter 9. As shown in FIG. 3, the observation command of the high-frequency component may be impressed on the voltage commands vd* and vq* but not be impressed on the current commands id* and iq*, and the magnetic-pole position may be identified based on the feedback currents respondent to the observation command.

Figure 4:
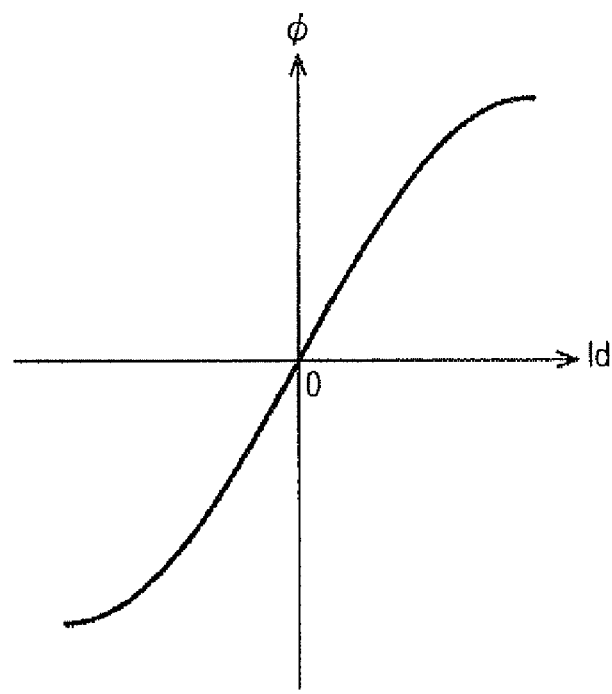
FIG. 4 is a graph showing a d-axis magnetic flux property without consideration of a permanent magnet.
Figure 5:
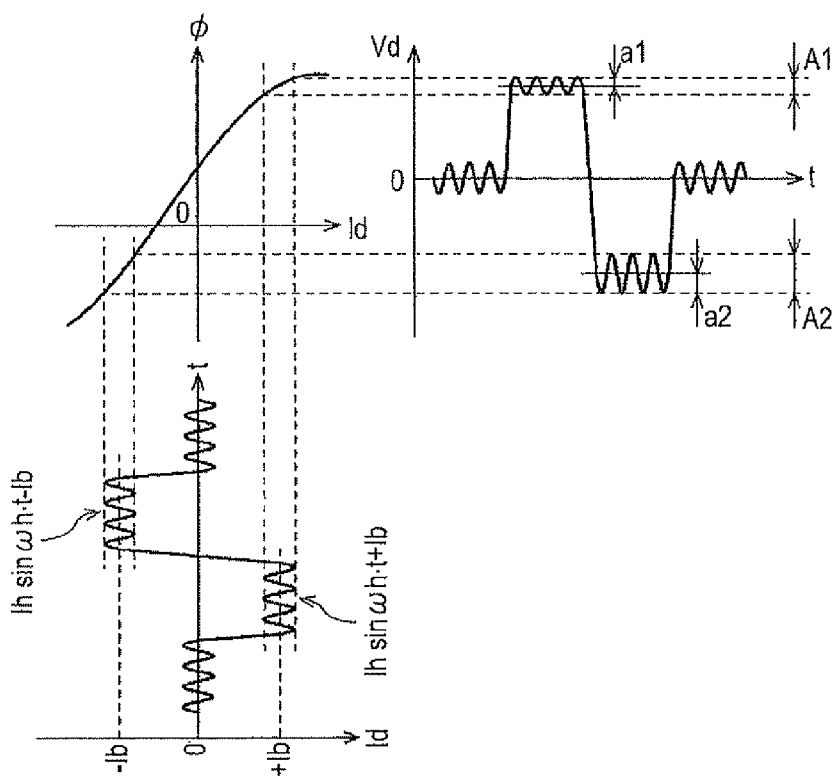
FIG. 5 is a diagram showing the relationship among a magnetic flux property, an observation command, and a response voltage in a case where the d-axis positive direction squares with the N pole of the permanent magnet.
Figure 6:
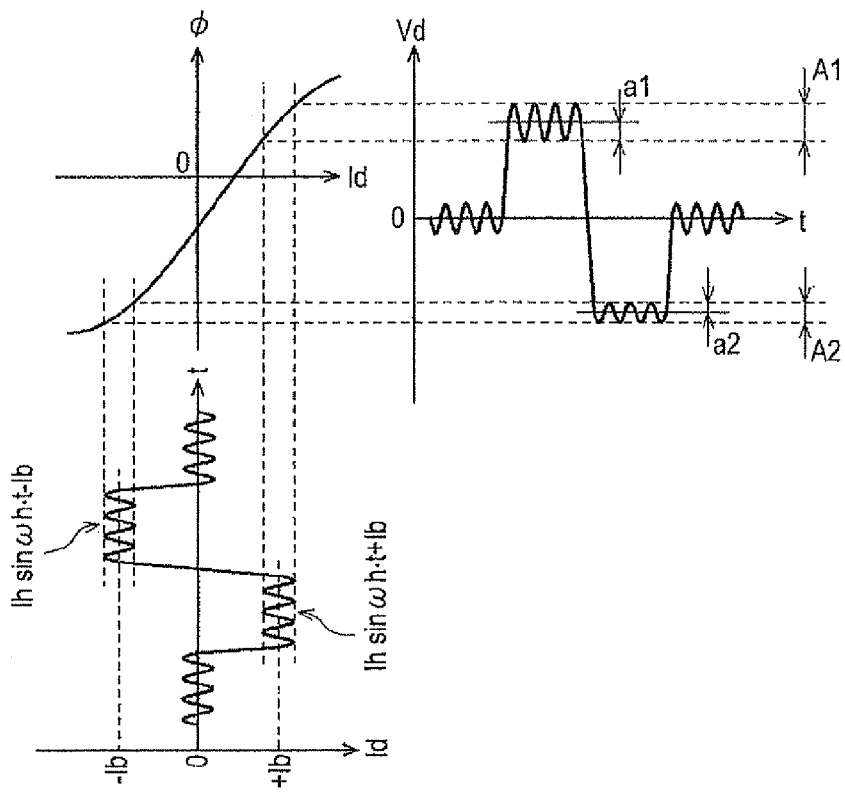
FIG. 6 is a diagram showing the relationship among the magnetic flux property, observation command, and response voltage in a case where the d-axis position direction squares with the S pole of the permanent magnet.

When position identification by the position identification section 6 is completed, a DC bias component±Ib is impressed on the d-axis current command id* on the basis of the identified θ. The magnetic flux φ in an electrically generated magnetic field becomes, as shown in FIG. 4, a nil when the d-axis current Id is a nil. However, since the motor MG is a permanent magnet type motor, even when the d-axis current Id is a nil, the magnetic flux φ of the permanent magnet exists. Therefore, as shown in FIG. 5 and FIG. 6, even when the d-axis current Id is a nil, the magnetic flux φ does not become a nil. FIG. 5 shows a case where the polarity is the N-pole side, that is, the N pole is aligned with the positive direction of the d-axis. Even when the d-axis current Id is a nil, a positive magnetic flux φ exists. FIG. 6 shows a case where the polarity is the S-pole side, that is, the N pole is aligned with the negative direction of the d-axis. Even when the d-axis current Id is a nil, a negative magnetic flux φ exists.

As mentioned above, the DC bias component±Ib is a value of a d-axis current Id equivalent to a magnitude causing the motor MG to be magnetically saturated. As shown in FIG. 5, when the polarity is the N-pole side, even if the d-axis current Id is a nil, the motor MG already has a positive magnetic flux φ. Therefore, when the DC bias component Ib that becomes an offset component in the positive direction is impressed on the d-axis current Id, the motor MG reaches a magnetic saturation domain. In the domain, even when a high-frequency component is impressed on the d-axis current Id, a magnetic flux φ that is changed in response to the high-frequency component is a little. In contrast, even when the DC bias component Ib that becomes an offset component in the negative direction is impressed on the d-axis current Id, the motor MG does not reach the magnetic saturation domain. Therefore, when the high-frequency component is impressed on the d-axis current Id, the magnetic flux φ is sufficiently changed in response to the high-frequency component. The change in the magnetic flux φ can be observed as a response voltage using the d-axis voltage Vd. As shown in FIG. 5, a wave height A1 (first amplitude a1=A1/2) of a high-frequency component of the d-axis voltage Vd attained while the DC bias component Ib in the positive direction is impressed is smaller than a wave height A2 (second amplitude a2=A2/2) of the high-frequency component of the d-axis voltage Vd attained while the DC bias component Ib in the negative direction is impressed. Therefore, the polarity identification section 7 can identify the polarity of the permanent magnet on the basis of the relationship of large and small magnitudes between the first amplitude a1 and second amplitude a2.

In contrast, as shown in FIG. 6, when the polarity is the S-pole side, even if the d-axis current Id is a nil, the motor MG already has a negative magnetic flux φ. Therefore, when the DC bias component Ib in the negative direction is impressed on the d-axis current Id, the motor MG reaches the magnetic saturation domain. In the domain, even if a high-frequency component is impressed on the d-axis current Id, a magnetic flux φ that is changed in response to the high-frequency component is a little. In contrast, even when the DC bias component Ib in the positive direction is impressed on the d-axis current Id, the motor MG does not reach the magnetic saturation domain. Therefore, if the high-frequency component is impressed on the d-axis current Id, the magnetic flux φ is sufficiently changed in response to the high-frequency component. As shown in FIG. 6, the wave height A2 (second amplitude a2=A2/2) of the high-frequency component of the d-axis voltage Vd attained when an offset component Ib in the negative direction is impressed is smaller than the wave height A1 (first amplitude a1=A1/2) of the high-frequency component of the d-axis voltage Vd attained while the offset component Ib in the positive direction is impressed. Therefore, the polarity identification section 7 can identify the polarity of the magnetic pole of the permanent magnet on the basis of the relationship of large and small magnitudes between the first amplitude and second amplitude.

The principles of identification of a magnetic-pole position of a permanent magnet and identification of polarity thereof by the rotation detection block 8 has been described so far. A flow of processing by the observation command impress block 1 and rotation detection block 8 will be described below using the flowchart of FIG. 7.

When a drive command for the motor MG is issued from the running control ECU or the like that is not shown, the motor control device 10 executes identification processing of a magnetic-pole position of a rotor of the motor MG and the polarity thereof prior to driving of the motor MG. First, as mentioned above, a magnetic-pole position θ is identified (step #10). For identification of the magnetic-pole position θ, the observation command impress block 1 impresses a predetermined high-frequency component alone as an observation command on the d-axis current command id* or voltage command vd*. As mentioned above, at this step, the DC bias component Ib is not impressed. The observation command impress block 1 and position identification section 6 execute convergent computation like the aforesaid one so as to identify the magnetic-pole position θ.

After the magnetic-pole position θ is identified, the NS polarity is identified over steps #21 to #26. Assuming that the phase of a vector space (d' q' vector space) used to designate the current commands id* and iq* is, as shown in FIG. 3, different from the phase of an actual vector space (dq vector space), the DC bias component Ib for the d'-axis is vector-decomposed to include an actual q-axis component. As mentioned above, the DC bias component Ib to be impressed on the d-axis current command id* has a magnitude causing the motor MG to be magnetically saturated. Therefore, the magnitude of a DC component to be impressed on the q-axis current command iq* due to vector decomposition cannot be ignored. Therefore, a large current command is given to the q-axis. A motor torque is generated, and the rotor of the motor MG is rotated. Therefore, preferably, step #10 is executed prior to identification of polarity, and the magnetic-pole position θ is accurately identified irrespective of the polarity.

The observation command impress block 1 impresses, in addition to the high-frequency component impressed at step #10, the DC bias component Ib on the d-axis current command id*. More particularly, the DC bias component Ib in the positive direction is impressed on the d-axis current command id* (step #21). The polarity identification section 7 acquires the wave height A1 (or amplitude a1) attained during a period during which the DC bias component takes on a positive certain value. Thereafter, the observation command impress block 1 impresses the DC bias component Ib in the negative direction on the d-axis current command id* (step #22). The polarity identification section 7 acquires the wave height A2 (or amplitude a2) attained during a period during which the DC bias component Ib takes on a negative certain value.

Figure 7:
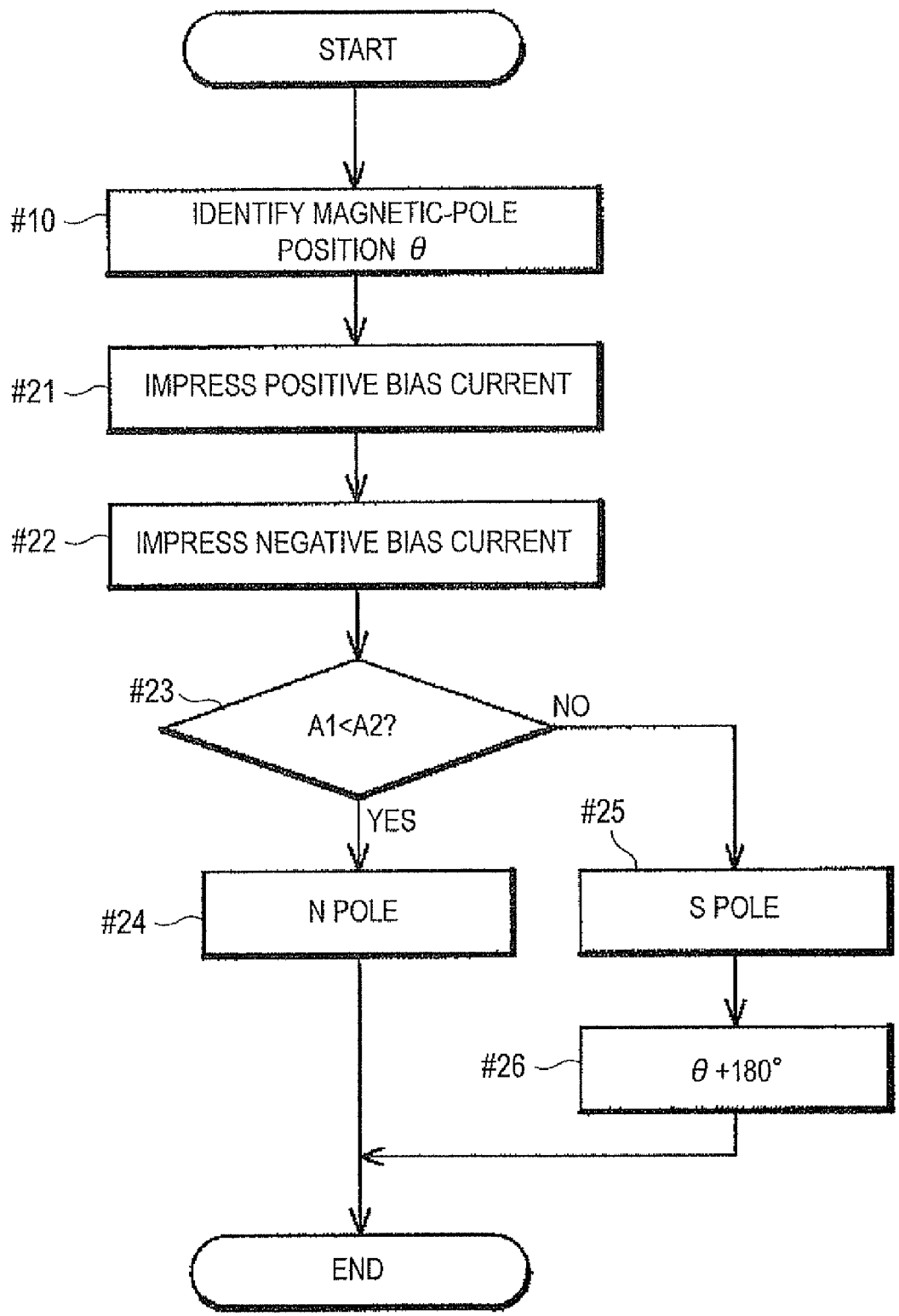
FIG. 7 is a flowchart illustratively showing identification processing of a magnetic-pole position and polarity.

The polarity identification section 7 identifies, as mentioned above, the polarity of a permanent magnet on the basis of the relationship of large and small magnitudes between the wave height A1 (or amplitude a1) and wave height A2 (or amplitude a2) (#23). More particularly, as shown in FIG. 7, when the wave height A2 is larger than the wave height A1 (when the second amplitude a2 is larger than the first amplitude a1), the positive direction of the d-axis is identified as the N pole (the polarity is the N pole) (#24). In contrast, when the wave height A1 is equal to or larger than the wave height A2 (when the first amplitude a1 is equal to or larger than the second amplitude a2), the positive direction of the d-axis is identified as the S pole (the polarity is the S pole) (#25). Incidentally, when the polarity is identified as the S pole, 180° is added to the θ value identified at step #10 of magnetic-pole position identification, and the θ value is thus updated (#26). The position of the magnetic pole of the permanent magnet and the polarity thereof are identified over steps #10 to #26, and the position of the magnetic pole of the permanent magnet is specified as one point within 360°.

In the foregoing embodiment, the voltage command vd* to be computed using the feedback current id by the current control block 2 has been described as a response voltage. Namely, a case where ordinary voltage computation (computation expressed by the equations (1) to (3)) is used in combination in vector control has been described as an example.

In other words, a case where the polarity is identified by computing the response voltage using the function of ordinary vector control has been described as an example. The polarity identification is processing to be executed immediately before activation of the motor MG. Therefore, execution of the ordinary vector control is not begun yet, and no problem arises from utilization of the function of the ordinary vector control. The combined use of the function makes it possible to suppress expansion of the scale of the motor control device 10

The present invention can be applied to a motor control device having a function of detecting a magnetic-pole position of a permanent magnet synchronous motor in a sensorless manner.

What is claimed is:

1. A motor control device that controls an AC motor in a vector space with a d-axis, which is in a direction of a magnetic field generated by a permanent magnet disposed in a rotor of the AC motor, and a q-axis orthogonal to the d-axis, comprising:
a current control block that computes voltage commands in the vector space on the basis of current commands in the vector space, and feedback currents that have detection values of currents, which flow into respective stator coils of the AC motor, coordinate-transformed into the vector space and fed back;
an observation command impress block that impresses a predetermined high-frequency component as an observation command on the current command on a d-axis or the voltage command on the d-axis, and positively and negatively symmetrically impresses thereon a DC bias component, which takes on a certain value over a predetermined period and has a magnitude that causes the motor to be magnetically saturated, as the observation command; and
a polarity identification section that identifies the polarity of a magnetic pole of the permanent magnet on the basis of a relationship of large and small magnitudes between a first amplitude, which is attained during a period during which the DC bias component takes on a positive certain value, among amplitudes of the high-frequency component contained in a d-axis response voltage computed based on the feedback current respondent to the observation command, and a second amplitude attained during a period during which the DC bias component takes on a negative certain value.

2. The motor control device according to claim 1, wherein:
the observation command impress block impresses a predetermined high-frequency component as the observation command on the current command on a d-axis, and positively and negatively symmetrically impresses thereon a DC bias component, which takes on a certain value over a predetermined period and has a magnitude that causes the motor to be magnetically saturated, as the observation command; and
the response voltage is the voltage command on the d-axis computed based on the feedback current respondent to the observation command.

3. The motor control device according to claim 2, further comprising a position identification section that identifies the position of the magnetic pole of the permanent magnet on the basis of high-frequency components of the voltage commands, which are computed based on the feedback currents respondent to the high-frequency component of the observation command, irrespective of the polarity, wherein:
before the position of the permanent magnet is identified by the position identification section, the observation command impress block impresses the high-frequency component as the observation command; and after the position of the permanent magnet is identified, the observation command impress block impresses the high-frequency component and bias component as the observation command.

4. The motor control device according to claim 1, further comprising a position identification section that identifies the position of the magnetic pole of the permanent magnet on the basis of high-frequency components of the voltage commands, which are computed based on the feedback currents respondent to the high-frequency component of the observation command, irrespective of the polarity, wherein:

before the position of the permanent magnet is identified by the position identification section, the observation command impress block impresses the high-frequency component as the observation command; and after the position of the permanent magnet is identified, the observation command impress block impresses the high-frequency component and bias component as the observation command.

* * * * *